United States Patent
Liao et al.

(10) Patent No.: US 11,436,451 B2
(45) Date of Patent: Sep. 6, 2022

(54) MULTIMODAL FINE-GRAINED MIXING METHOD AND SYSTEM, DEVICE, AND STORAGE MEDIUM

(71) Applicants: Harbin Institute of Technology (Shenzhen) (Shenzhen Institute of Science and Technology Innovation, Harbin Institute of Technology), Guangdong (CN); Dongguan University of Technology, Guangdong (CN)

(72) Inventors: Qing Liao, Guangdong (CN); Ye Ding, Guangdong (CN); Binxing Fang, Guangdong (CN); Xuan Wang, Guangdong (CN)

(73) Assignees: Harbin Institute of Technology (Shenzhen) (Shenzhen Institute of Science and Technology Innovation, Harbin Institute of Technology), Shenzhen (CN); Dongguan University of Technology, Dongguan (CN)

( * ) Notice: Subject to any disclaimer, the term of this patent is extended or adjusted under 35 U.S.C. 154(b) by 0 days.

(21) Appl. No.: 17/577,099

(22) Filed: Jan. 17, 2022

(65) Prior Publication Data

US 2022/0237420 A1 Jul. 28, 2022

(30) Foreign Application Priority Data

Jan. 25, 2021 (CN) .......................... 202110094267.1

(51) Int. Cl.
*G06K 9/62* (2022.01)

(52) U.S. Cl.
CPC ......... *G06K 9/6293* (2013.01); *G06K 9/6232* (2013.01)

(58) Field of Classification Search
CPC .............................................. G06K 9/62–6298
See application file for complete search history.

(56) References Cited

U.S. PATENT DOCUMENTS

2014/0267301 A1* 9/2014 Yang ..................... G09G 5/24
345/467

FOREIGN PATENT DOCUMENTS

CN 111680541 A * 9/2020 ............. G06F 40/30

OTHER PUBLICATIONS

Zhang et al, "Sentiment Analysis of Social Media via Multimodal Feature Fusion" (published in Symmetry 2020, vol. 12, Dec. 2020) (Year: 2020).*

* cited by examiner

*Primary Examiner* — Casey L Kretzer

(57) ABSTRACT

The present disclosure provides a multimodal fine-grained mixing method and system, a device, and a storage medium. The method includes: extracting data features from multimodal graphic and textual data, and obtaining each composition of the data features, the data features including a visual regional feature and a text word feature; performing fine-grained classification on modal information of each composition of the data features, to obtain classification results; and performing inter-modal and intra-modal information fusion on each composition according to the classification results, to obtain a fusion feature. The method enables a multimodal model to utilize a complementary characteristic of the multimodal data, with no influence by irrelevant information.

12 Claims, 7 Drawing Sheets

```
┌─────────────────────────────────────────────────────┐
│ Calculate an intra-modal correlation and an inter-modal correlation of │
│  each visual feature composition, to obtain characteristics of each    │── S21
│  visual feature composition, so as to obtain the classification result of │
│                the visual regional feature                             │
└─────────────────────────────────────────────────────┘
                             │
                             ▼
┌─────────────────────────────────────────────────────┐
│ Calculate an intra-modal correlation and an inter-modal correlation of │── S22
│  each text feature composition, to obtain characteristics of each text │
│ feature composition, so as to obtain the classification result of the text │
│                         word feature                                   │
└─────────────────────────────────────────────────────┘
```

FIG. 2

MULTIMODAL FINE-GRAINED MIXING METHOD AND SYSTEM, DEVICE, AND STORAGE MEDIUM

CROSS REFERENCE TO RELATED APPLICATIONS

The present application claims the benefit of Chinese Patent Application No. 202110094267.1 filed on Jan. 25, 2021, the contents of which are incorporated herein by reference in their entirety.

TECHNICAL FIELD

The present disclosure relates to the field of machine vision technologies, and in particular, to a multimodal fine-grained mixing method and system, a device, and a storage medium.

BACKGROUND ART

As Internet technology rapidly advances, data in the form of text, image, audio, video, etc. is in exponential growth. Multimodal data is used to tell the same event or subject from different respects, which enriches people's understanding. How to effectively us the multimodal data to complete a designated task in a corresponding scenario has become a popular research topic.

In recent years, deep learning technologies have developed rapidly, which enables people to solve more complex machine learning problems, and has made great progress in analysis and processing of the multimodal data. Various application fields of the multimodal data, such as human activity recognition, medical applications, autonomous driving, image video annotations, cross-modal retrieval, etc. have attracted researchers' interest.

However, the existing multimodality learning method uses a single modality as a unit when selecting an interaction manner for inter-modal information. For example, in a case of multiple modalities including a graphic modality and a textual modality, inter-modal interaction and intra-modal interaction are performed by taking the graphic modality and the textual modality as a unit, and different compositions in each modality use the same interaction manner. Each composition represents each regional feature in the graphic modality or each word in the textual modality. However, since different compositions in each modality have their own different characteristics, they require different interaction manners. The existing multimodality learning method does not take into account of different interaction manners for different compositions, resulting in that some compositions in one modality are influenced by unrelated information in another modality.

SUMMARY

An objective of the present disclosure is to provide a multimodal fine-grained mixing method, which takes each composition in each modality of the multimodal data as a unit, and adaptively selects interaction manners, to realize multimodal fine-grained information interaction. This method selects suitable mixing interaction manners according to characteristics of different compositions, so as to utilize information of inter-modal correlations in the multimodal data, with no influence by irrelevant information.

To achieve the above objective, the present disclosure provides a multimodal fine-grained mixing method, including: extracting data features from multimodal graphic and textual data, and obtaining each composition of the data features, the data features including a visual regional feature and a text word feature; performing fine-grained classification on modal information of each composition of the data features, to obtain classification results of the data features; and performing inter-modal and intra-modal information fusion on each composition according to the classification results of the data features, to obtain a fusion feature.

Optionally, the step of extracting data features from multimodal graphic and textual data, and obtaining each composition of the data features includes: obtaining a visual regional feature V from the multimodal graphic and textual data by using a faster region-based convolutional neural network (RCNN) model, $V=RCNN(I; \theta_{RCNN})$, I representing inputted image data, $V \in R^{d_E \times LL_V}$, $L_V$ being a quantity of the compositions in the visual regional feature, and $d_V$ being a length of the visual regional feature;

obtaining a text word feature E from the multimodal graphic and textual data by using a gated recurrent unit (GRU), $E=GRU(Q, \theta_{GRU})$, Q representing inputted text data, $E \in R^{d_E \times L_E}$, $L_E$ representing an overall length of the text data, and $d_E$ representing a length of the compositions in the text word feature; and converting the visual regional feature V and the text word feature E to vectors with the same dimension by a fully-connected layer, to obtain each visual feature composition $V_i$ in the visual regional feature V and each text feature composition $E_i$ in the text word feature E:

$$V_i = \tan h(W_V V_i + b_V) \in R^{d_h}, i \in [1, L_V];$$

$$E_i = \tan h(W_E E_i + b_E) \in R^{d_h}, i \in [1, L_E].$$

Optionally, the step of performing fine-grained classification on modal information of each composition of the data features, to obtain classification results of the data features includes: calculating an intra-modal correlation and an inter-modal correlation of each visual feature composition $V_i$, to obtain characteristics of each visual feature composition $V_i$, so as to obtain a classification result of the visual regional feature; and calculating an intra-modal correlation and an inter-modal correlation of each text feature composition $E_i$, to obtain characteristics of each text feature composition $E_i$, so as to obtain a classification result of the text word feature.

Optionally, the step of calculating an intra-modal correlation and an inter-modal correlation of each visual feature composition $V_i$, to obtain characteristics of each visual feature composition $V_i$, so as to obtain a classification result of the visual regional feature includes: calculating the intra-modal correlation $R_i^{VB}$ of each visual feature composition $$M_{ij}^V = \frac{V_i^T V_j}{\|V_i\| \|V_j\|}, i \in [1, L_V], j \in [1, L_V];$$

$$B_i^V = \Sigma_{j=1}^{L_V} \beta_{ij}^V V_j;$$

$$\beta_{ij}^V = \frac{\exp(M_{ij}^V)}{\sum_{j=1}^{L_V} \exp(M_{ij}^V)};$$

$$R_i^{VB} = \frac{V_i^T B_i^V}{\|V_i\|\|B_i^V\|};$$

calculating the inter-modal correlation $R_i^{VA}$ of each visual feature composition $V_i$:

$$S_{ij}^V = \frac{V_i^T E_j}{\|V_i\|\|E_j\|}, i \in [1, L_V], j \in [1, L_E];$$

$$A_i^V = \Sigma_{j=1}^{L_E} \alpha_{ij}^V E_j;$$

$$\alpha_{ij}^V = \frac{\exp(s_{ij}^V)}{\sum_{j=1}^{L_E} \exp(s_{ij}^V)};$$

$$R_i^{VA} = \frac{V_i^T A_i^V}{\|V_i\|\|A_i^V\|};$$

and
performing normalization on the intra-modal correlation $R_i^{VB}$ and the inter-modal correlation $R_i^{VA}$ of each visual feature composition $V_i$, to obtain the characteristics of each visual feature composition $V_i$:

$$R_i^{VA} = \text{softmax}(R_i^{VA}, R_i^{VB});$$

$$R_i^{VB} = \text{softmax}(R_i^{VB}, R_i^{VA}).$$

The step of calculating an intra-modal correlation and an inter-modal correlation of each text feature composition $E_i$, to obtain characteristics of each text feature composition $E_i$, so as to obtain a classification result of the text word feature includes:
calculating the intra-modal correlation $R_i^{EB}$ of each text feature composition $E_i$:

$$M_{ij}^E = \frac{E_i^T E_j}{\|E_i\|\|E_j\|}, i \in [1, L_E], j \in [1, L_E];$$

$$\beta_{ij}^E = \frac{\exp(M_{ij}^E)}{\sum_{j=1}^{L_E} \exp(M_{ij}^E)};$$

$$B_i^E = \Sigma_{j=1}^{L_E} \beta_{ij}^E E_j;$$

$$R_i^{EB} = \frac{E_i^T B_i^E}{\|E_i\|\|B_i^E\|};$$

calculating the inter-modal correlation $R_i^{EA}$ of each text feature composition $E_i$:

$$S_{ij}^E = \frac{E_i^T V_j}{\|E_i\|\|V_j\|}, i \in [1, L_E], j \in [1, L_V];$$

$$\alpha_{ij}^E = \frac{\exp(S_{ij}^E)}{\sum_{j=1}^{L_V} \exp(S_{ij}^E)};$$

$$A_i^E = \Sigma_{j=1}^{L_V} \alpha_{ij}^E V_j;$$

$$R_i^{EA} = \frac{E_i^T A_i^E}{\|E_i\|\|A_i^E\|};$$

and
performing normalization on the intra-modal correlation $R_i^{EB}$ and the inter-modal correlation $R_i^{EA}$ of each text feature composition $E_i$, to obtain the characteristics of each text feature composition $E_i$:

$$R_i^{EA} = \text{softmax}(R_i^{EA}, R_i^{EB});$$

$$R_i^{EB} = \text{softmax}(R_i^{EB}, R_i^{EA});$$

Optionally, the step of performing intra-modal and inter-modal information fusion on each composition according to the classification results of the data features, to obtain a fusion feature includes: converting the visual regional feature and the text word feature into corresponding query features and key-value pair features; calculating self-modal information and cross-modal information of the visual regional feature; and obtaining a fusion visual feature by using a residual structure according to products obtained by respectively multiplying the characteristics of each visual regional composition with self-attention weights and cross-modal attention weights of the visual regional feature.

Optionally, the step of converting the visual regional feature and the text word feature into corresponding query features and key-value pair features; calculating self-modal information and cross-modal information of the visual regional feature; and obtaining a fusion visual feature by using a residual structure according to products obtained by respectively multiplying the characteristics of each visual regional composition with self-attention weights and cross-modal attention weights of the visual regional feature includes:

converting the visual regional feature V into a visual regional query feature $V_Q$, a visual key feature $V_K$, and a regional value feature $V_V \in R^{L_V \times dim}$ correspondingly;
the visual regional query feature $V_Q$=Linear(V; $\theta_{VQ}$);
the visual key feature $V_K$=Linear(V; $\theta_{VK}$);
the regional value feature $V_V$=Linear(V; $\theta_{VV}$);
converting the text word feature E into a word query feature $E_Q$, a word key feature $E_K$, and a word value feature $E_V \in R^{L_E \times dim}$ correspondingly;
the word query feature $E_Q$=Linear(E; $\theta_{EQ}$);
the word key feature $E_K$=Linear(E; $\theta_{EK}$);
the word value feature $E_V$=Linear(E; $\theta_{EV}$);
Linear representing a fully-connected layer including a parameter $\theta$, and dim representing a common dimension after information conversion of the two modalities;
calculating a dot product $V_Q V_K^T$ (of the visual regional query feature $V_Q$ and the visual key feature $V_K$ pair corresponding to the visual regional feature V, to obtain the self-attention weights of the visual regional feature V, and performing normalization on the self-attention weights, to obtain the self-modal information;

$$SA(V_Q, V_K, V_V) = softmax\left(\frac{V_Q V_K^T}{\sqrt{dim}}\right) V_V;$$

calculating a dot product $V_Q E_K^T$ (of the visual regional query feature $V_Q$ corresponding to the visual regional feature V and the word key feature $E_K$ pair, to obtain the across-modal attention weights of the visual regional feature V, and performing normalization on the across-modal attention weights, to obtain cross-modal information of the visual regional feature V;

$$GA(V_Q, E_K, E_V) = softmax\left(\frac{V_Q E_K^T}{\sqrt{dim}}\right) E_V;$$

and

Obtaining the fusion visual feature by using the residual structure according to products obtained by respectively multiplying the characteristics $R_i^{VA}$ and $R_i^{VB}$ of each visual regional composition $V_i$ with the self-attention weight $SA(V_i)$ and the cross-modal attention weight $GA(V_i)$ of each visual regional composition $V_i$:

$$\tilde{V}_i = V_i + R_i^{VA} \times VSA(V_i) + R_i^{VB} \times VGA(V_i).$$

Optionally, after the step of performing intra-modal and inter-modal information fusion on each composition according to the classification results of the data features, to obtain a fusion feature includes: performing multiple times of fine-grained classification and information fusion on the fusion feature, to obtain characterization data with identifiability. The characterization data includes a graphic characterization and a textual characterization.

According to another aspect, the present disclosure provides a multimodal fine-grained mixing system adopting the multimodal fine-grained mixing method in the foregoing embodiments, including: a feature extraction module, a fine-grained classification module, and a fusion module. The feature extraction module is configured to extract data features from multimodal graphic and textual data, and obtain each composition of the data features. The data features include a visual regional feature and a text word feature. The fine-grained classification module is configured to perform fine-grained classification on modal information of each composition of the data features, to obtain classification results of the data features. The fusion module is configured to perform inter-modal and intra-modal information fusion on each composition according to the classification results of the data features, to obtain a fusion feature.

According to still another aspect, the present disclosure provides a device, including a memory and one or more processors. The memory is configured to store one or more programs. The one or more programs, when executed by the one or more processors, cause the one or more processors to perform the multimodal fine-grained mixing method described in any of the foregoing embodiments.

According to still another aspect, the present disclosure provides a computer-readable storage medium, which stores a computer program instruction. The computer program instruction, when executed by a processor, causes the processor to perform one or more steps in the multimodal fine-grained mixing method described in any of the foregoing embodiments.

Compared to the related art, the multimodal fine-grained mixing method and system, the device, and the storage medium according to the embodiments of the present disclosure have following beneficial effects. When performing the multimodal fine-grained mixing, the present disclosure does not take the modality as a unit, but rather, selects suitable interaction manners with consideration of the characteristics of different compositions in each modality and a difference in the context, which enables a multimodal model to utilize a complementary characteristic of the multimodal data, with no influence by irrelevant information.

BRIEF DESCRIPTION OF THE DRAWINGS

FIG. 2 is a flowchart of sub-steps in step S20 of a multimodal fine-grained mixing method according to an embodiment of the present disclosure.

In the Figures: 100, multimodal fine-grained mixing system; 101, feature extraction module; 102, fine-grained classification module; 103, fusion module.

DETAILED DESCRIPTION OF THE EMBODIMENTS

The present disclosure will be further described below with reference to the accompanying drawings and embodiments. The following embodiments are used to illustrate the present disclosure, but not to limit the scope of the present disclosure.

In the present disclosure, unless otherwise specified, throughout the specification and claims, the term "include" is interpreted as an open and inclusive meaning, namely "including, but not limited to". In the description of the specification, the term "some embodiments" is intended to indicate that a specific feature, structure, material, or characteristic related to the embodiments is included in at least one embodiment of the present disclosure. The schematic representation of the above term does not necessarily refer to the same embodiment. In addition, the specific feature, structure, material or characteristic described may be included in any one or more embodiments in any suitable manner.

In the present disclosure, unless otherwise specified, "plurality" means two or more. "A and/or B" includes following three combinations: only A, only B, and a combination of A and B.

Figure 1:
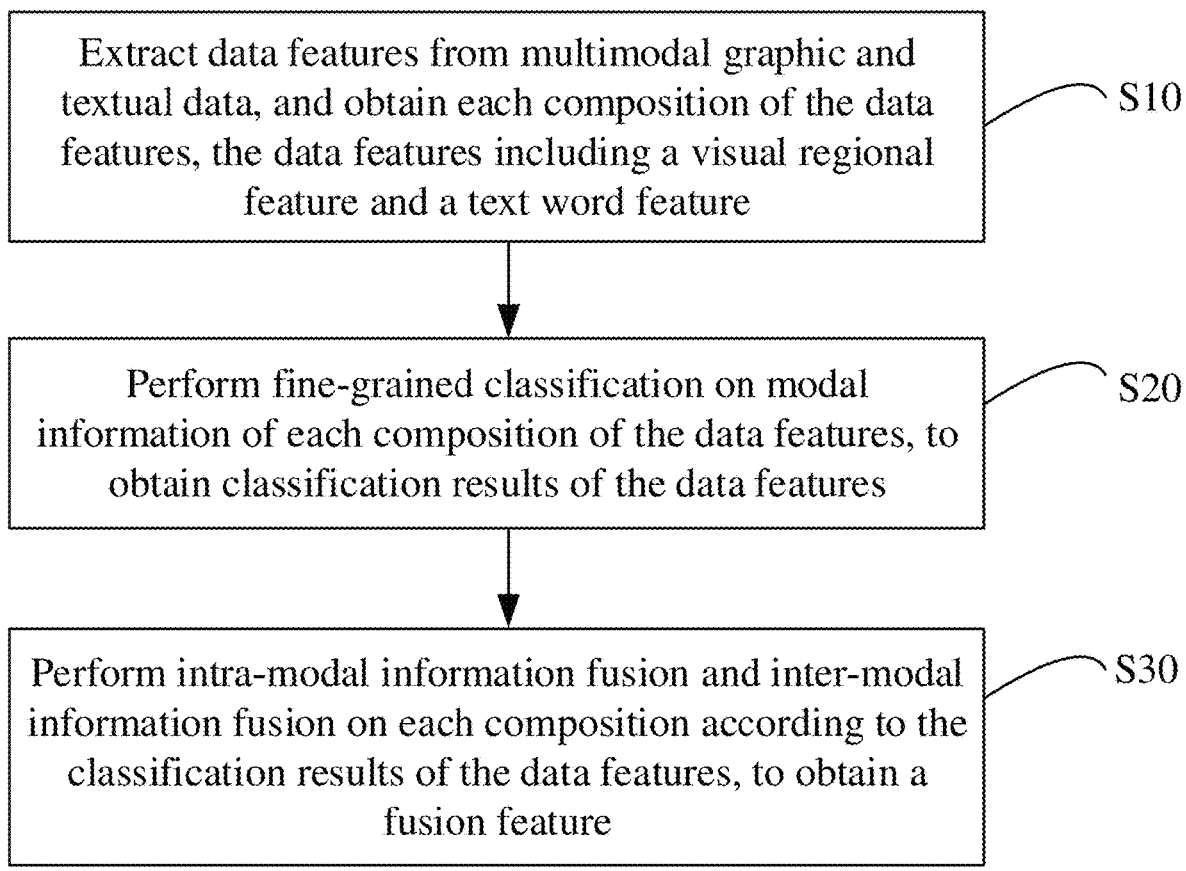
FIG. 1 is a flowchart of a multimodal fine-grained mixing method according to an embodiment of the present disclosure.

As shown in FIG. 1, an embodiment of the present disclosure provides a multimodal fine-grained mixing method, including:

S10. Extract data features from multimodal graphic and textual data, and obtain each composition of the data features. The data features include a visual regional feature and a text word feature.

It will be appreciated that each information source or form may be referred to as a modality, including but not limited to any of the following: human senses of touching, hearing, sight and smell; information mediums such as voice, video, text, etc.; and various sensors, such as radar, infrared, accelerometer, etc. A corresponding data feature may be extracted from any modality. The data features in the embodiment are not limited to the visual regional feature and the text word feature. In some embodiments, S10 includes:

The visual regional feature V is obtained from the multimodal graphic and textual data by using a faster region-based convolutional neural network (RCNN) model, V=RCNN (I; $\theta_{RCNN}$).

Where, I represents inputted image data, $V \in R^{d_V \times L_V}$, $L_V$ is a quantity of the compositions in the visual regional feature, and $d_V$ is a length of the visual regional feature.

Exemplarily, the visual regional feature V is obtained by the faster RCNN model which has been pre-trained on the Visual Genome dataset. 100 candidate regions are extracted for each image, namely the compositions and the corresponding regional features. For the given inputted image I, the extracted visual regional feature may be expressed as $V \in R^{d_V \times L_V}$, $L_V$ being the quantity of the compositions in the visual regional feature, and $d_V$ being the length of the visual regional feature. The regional feature of an i-th visual feature composition may be expressed as $V_i \in R^{d_v}$.

The text word feature E is obtained from the multimodal graphic and textual data by using a gated recurrent unit (GRU), E=GRU(Q, $\theta_{GRU}$).

Where, Q represents inputted text data, $E \in R^{d_E \times L_E}$, $L_E$ represents an overall length of the text data, and $d_E$ represents a length of the compositions in the text word feature.

Exemplarily, word embeddings created by global vectors for word representation (Glove) are used as an input of the GRU, to obtain the text word feature E. For the given inputted text data Q, the text word feature is obtained by the GRU as $E \in R^{d_E \times L_E}$, and a j-th text feature composition may be expressed as $e_j \in R^{d_E}$, $L_E$ representing an overall length of the text data, and $d_E$ representing the length of the compositions in the text word feature.

The visual regional feature is fixed during a training process of an entire system model, while the text word feature is trained from the beginning and updated along with other parameters of the system model.

Then, the visual regional feature V and the text word feature E are converted to vectors with the same dimension by a fully-connected layer, to obtain each visual feature composition $V_i$ in the visual regional feature V and each text feature composition $E_i$ in the text word feature E.

$$V_i = \tan h(W_V V_i + b_V) \in R^{d_h}, i \in [1, L_V]$$

$$E_i = \tan h(W_E E_i + b_E) \in R^{d_h}, i \in [1, L_E]$$

S20 is started after S10 is completed, see FIG. 1 again, S20. Perform fine-grained classification on modal information of each composition of the data features, to obtain classification results of the data features.

In some embodiments, as shown in FIG. 2, S20 includes:

S21. Calculate an intra-modal correlation and an intermodal correlation of each visual feature composition $V_i$, to obtain characteristics of each visual feature composition $V_i$, so as to obtain the classification result of the visual regional feature.

First, the intra-modal correlation $K_i^{VB}$ is calculated according to context information of each visual feature composition $V_i$ in the multimodal graphic and textual data, namely calculating the intra-modal correlation $K_i^{VB}$ of each visual feature composition $V_i$.

Figure 3:
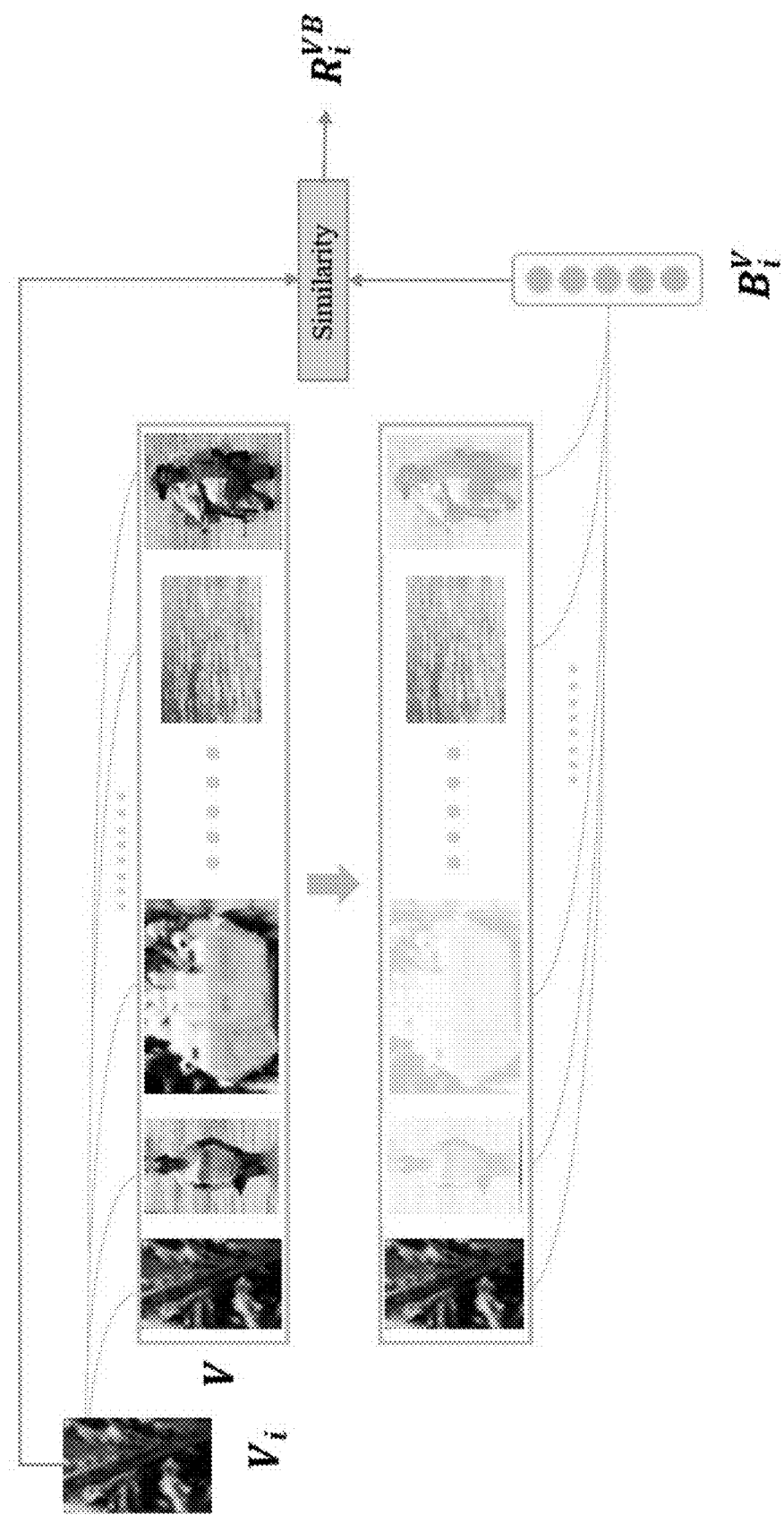
FIG. 3 is a flowchart of calculating an inter-modal correlation of a visual feature composition according to an embodiment of the present disclosure.

As shown in FIG. 3, a cosine similarity matrix M is calculated for each visual feature composition $V_i$ in the multimodal graphic and textual data. Each element $M_{ij}^V$ in the matrix M represents a similarity between the i-th visual feature composition and a j-th visual feature composition.

$$M_{ij}^V = \frac{V_i^T V_j}{\|V_i\| \|V_j\|}, i \in [1, L_V], j \in [1, L_V]$$

A weighted joint characterization $B_i^V$ of the visual regional feature is defined for each visual feature composition in the visual regional feature. This characterization represents a particular global representation of the visual regional feature under a guidance of a particular visual feature composition.

$$B_i^V = \Sigma_{j=1}^{L_V} \beta_{ij}^V V_j;$$

$$\beta_{ij}^V = \frac{\exp(M_{ij}^V)}{\sum_{j=1}^{L_V} \exp(M_{ij}^V)}$$

In order to determine an importance of each visual feature composition in a given visual regional feature context, a correlation between the i-th visual feature composition $V_i$ and the visual regional feature is defined as a cosine similarity between the weighted joint characterization $B_i^V$ of the visual regional feature and the visual feature composition $V_i$.

$$R_i^{VB} = \frac{V_i^T B_i^V}{\|V_i\| \|B_i^V\|}$$

Figure 4:
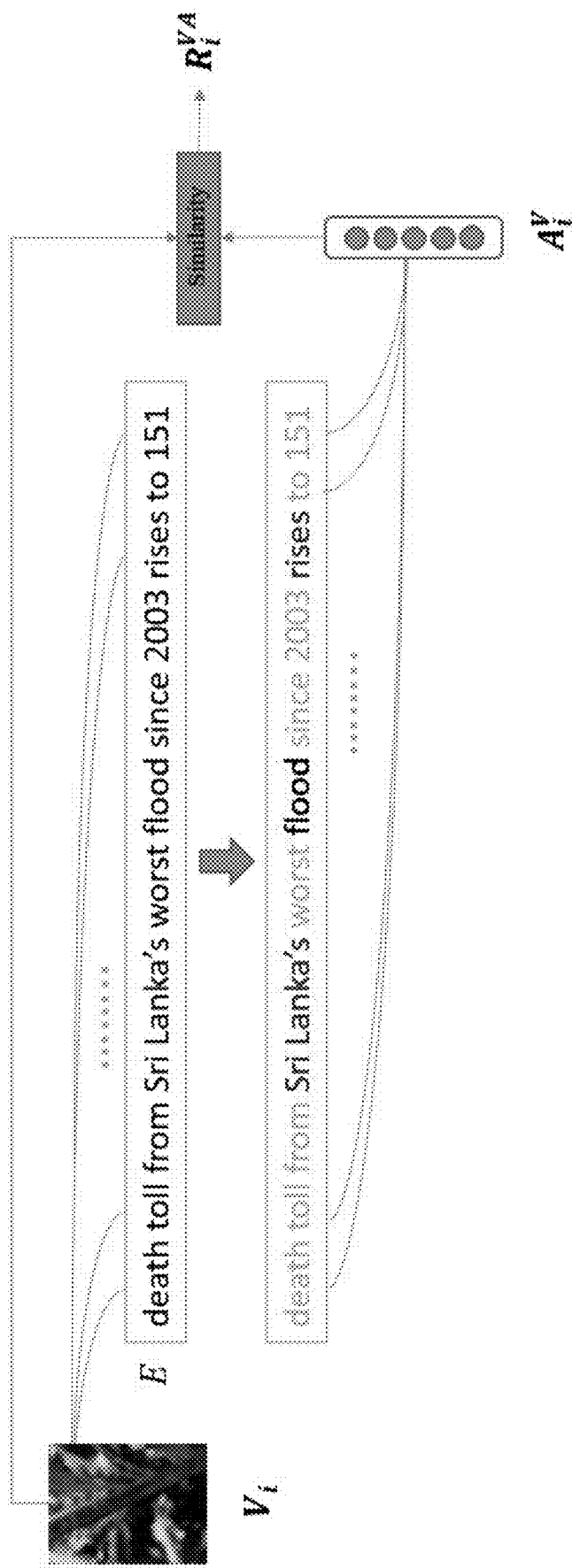
FIG. 4 is a flowchart of calculating an intra-modal correlation of a visual feature composition according to an embodiment of the present disclosure.

Second, as shown in FIG. 4, a cosine similarity matrix S is calculated for each visual feature composition $V_i$ in the multimodal graphic and textual data. Each element $S_{ij}^V$ in the matrix S represents a similarity between the i-th visual feature composition in the visual regional feature and a j-th text feature composition in the text word feature, namely calculating the intra-modal correlation $R_i^{VA}$ of each visual feature composition $V_i$:

$$S_{ij}^V = \frac{V_i^T E_j}{\|V_i\| \|E_j\|}, i \in [1, L_V], j \in [1, L_E]$$

A weighted joint characterization $A_i^V$ is defined for each visual feature composition in the visual regional feature. This characterization represents a particular global representation of the text word feature under a guidance of a particular visual feature composition.

$$A_i^V = \Sigma_{j=1}^{L_E} \alpha_{ij}^V E_j$$

$$\alpha_{ij}^V = \frac{\exp(S_{ij}^V)}{\sum_{j=1}^{L_E}\exp(S_{ij}^V)}$$

In order to determine an importance of each visual feature composition in a given text word feature context, a correlation between the i-th visual feature composition and the text word feature is defined as a cosine similarity between the weighted joint characterization $A_i^V$ and the visual feature composition $V_i$.

$$R_i^{VA} = \frac{V_i^T A_i^V}{\|V_i\|\|A_i^V\|}$$

Finally, normalization is respectively performed on the intra-modal correlation $R_i^{VB}$ and the inter-modal correlation $R_i^{VA}$ of each visual feature composition $V_i$, to obtain the characteristics of each visual feature composition $V_i$:

$R_i^{VA}=\text{softmax}(R_i^{VA}, R_i^{VB})$ $R_i^{VB}=\text{softmax}(R_i^{VB}, R_i^{VA})$ S22 is started after S21 is completed, see FIG. 2 again, S22. Calculate an intra-modal correlation and an inter-modal correlation of each text feature composition $E_i$, to obtain characteristics of each text feature composition $E_i$, so as to obtain the classification result of the text word feature.

First, the intra-modal correlation $R_i^{EB}$ of each text feature composition $E_i$ is calculated:

$$M_{ij}^E = \frac{E_i^T E_j}{\|E_i\|\|E_j\|}, i \in [1, L_E], j \in [1, L_E]$$

$$\beta_{ij}^E = \frac{\exp(M_{ij}^E)}{\sum_{j=1}^{L_E}\exp(M_{ij}^E)}$$

$B_i^E = \sum_{j=1}^{L_E} \beta_{ij}^E E_j$ $$R_i^{EB} = \frac{E_i^T B_i^E}{\|E_i\|\|B_i^E\|}$$

Second, the inter-modal correlation $R_i^{EA}$ of each text feature composition $E_i$ is calculated:

$$S_{ij}^E = \frac{E_i^T V_j}{\|E_i\|\|V_j\|}, i \in [1, L_E], j \in [1, L_V]$$

$$\alpha_{ij}^E = \frac{\exp(S_{ij}^E)}{\sum_{j=1}^{L_V}\exp(S_{ij}^E)}$$

$A_i^E = \sum_{j=1}^{L_V} \alpha_{ij}^E V_j$ $$R_i^{EA} = \frac{E_i^T A_i^E}{\|E_i\|\|A_i^E\|}$$

Finally, normalization is respectively performed on the intra-modal correlation $R_i^{EB}$ and the inter-modal correlation $R_i^{EA}$ of each text feature composition $E_i$, to obtain the characteristics of each text feature composition $E_i$:

$R_i^{EA}=\text{softmax}(R_i^{EA}, R_i^{EB})$ $R_i^{EB}=\text{softmax}(R_i^{EB}, R_i^{EA})$ The calculation processes of the intra-modal correlation and the inter-modal correlation of each text feature composition $E_i$ are similar to those of each visual feature composition $V_i$, thus are not detailed herein.

In the embodiments, the intra-modal correlation and the inter-modal correlation of each visual feature composition $V_i$ and each text feature composition $E_i$ are calculated, so as to obtain the characteristics of each composition and a difference in its context, which provides a reference for a subsequent fusion process.

S30 is started after S22 is completed, see FIG. 1 again, S30. Perform intra-modal and inter-modal information fusion on each composition according to the classification results of the data features, to obtain a fusion feature.

Figure 5:
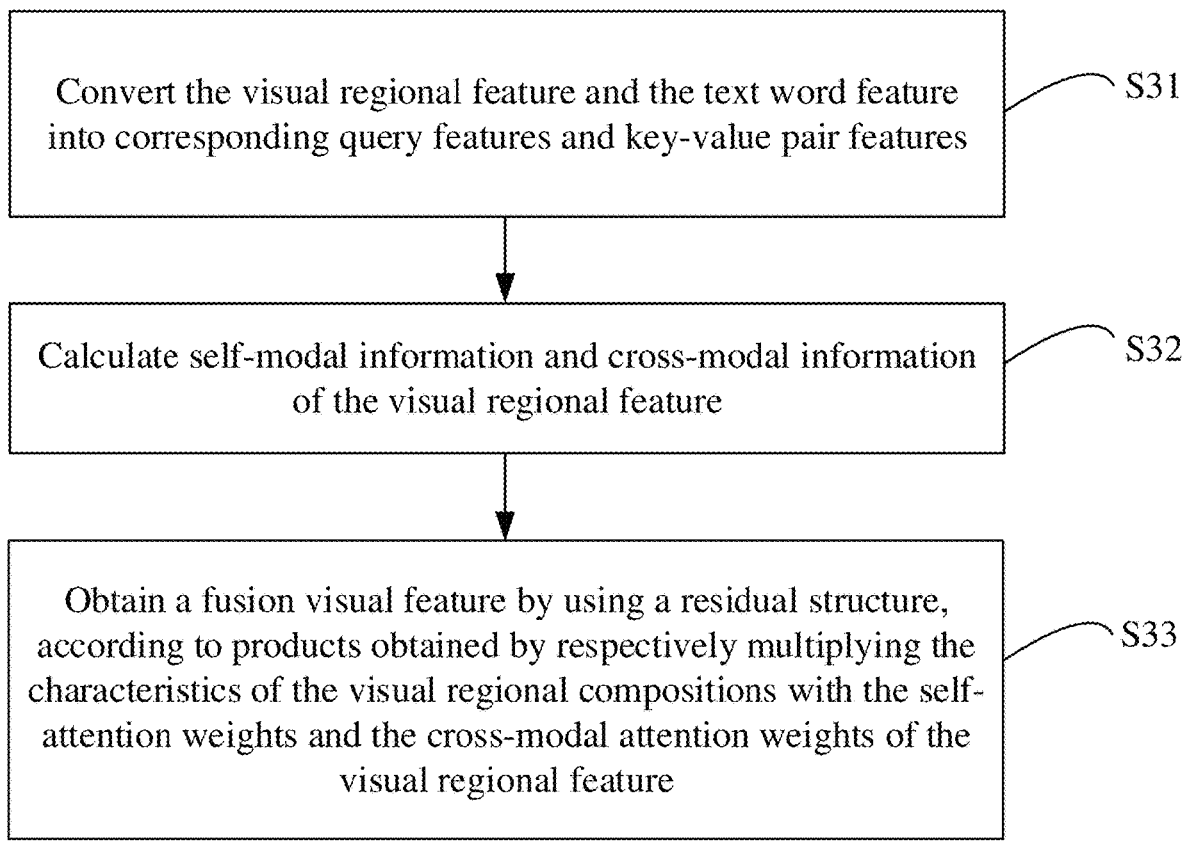
FIG. 5 is a flowchart of sub-steps in step S30 of a multimodal fine-grained mixing method according to an embodiment of the present disclosure.

In some embodiments, as shown in FIG. 5, S30 includes:

S31. Convert the visual regional feature and the text word feature into corresponding query features and key-value pair features.

The visual regional feature V is converted into a visual regional query feature $V_Q$, a visual key feature $V_K$, and a regional value feature $V_V \in R^{L_V \times dim}$ correspondingly.

The visual regional query feature is $V_Q=\text{Linear}(V; \theta_{VQ})$.
The visual key feature is $V_K=\text{Linear}(V; \theta_{VK})$.
The regional value feature is $V_V=\text{Linear}(V; \theta_{VV})$.

The text word feature E is converted into a word query feature $E_Q$, a word key feature $E_K$, and a word value feature $E_V \in R^{L_E \times dim}$ correspondingly.

The word query feature is $E_Q=\text{Linear}(E; \theta_{EQ})$.
The word key feature is $E_K=\text{Linear}(E; \theta_{EK})$.
The word value feature is $E_V=\text{Linear}(E; \theta_{EV})$.

Where, Linear represents a fully-connected layer including a parameter θ, and dim represents a common dimension after information conversion of the two modalities.

S32. Calculate self-modal information and cross-modal information of the visual regional feature.

A dot product $V_Q V_K^T$ of the visual regional query feature $V_Q$ and the visual key feature $V_K$ pair corresponding to the visual regional feature V is calculated, to obtain self-attention weights of the visual regional feature V. Then, normalization is performed on the self-attention weights, to obtain the self-modal information.

Exemplarily, the self-modal information is obtained by using a self-attention mechanism. First, the dot product $V_Q V_K^T$ of each visual regional query feature $V_Q$ and the visual key feature $V_K$ pair is calculated, so as to obtain original attention weights used to aggregate the visual regional feature to each visual feature composition. Then, normalization is performed on these attention weights, to obtain final attention weights. By using the final attention weights, information from the visual regional feature to a particular visual feature composition may be expressed as a weighted sum of the regional value feature $V_V$.

$$SA(V_Q, V_K, V_V) = \text{softmax}\left(\frac{V_Q V_K^T}{\sqrt{\text{dim}}}\right) V_V$$

A dot product $V_Q E_K^T$ of the visual regional query feature $V_Q$ corresponding to the visual regional feature V and the word key feature $E_K$ pair, to obtain across-modal attention weights of the visual regional feature V. Then, normalization is performed on the across-modal attention weights, to obtain the cross-modal information corresponding to the visual regional feature V.

Exemplarily, the cross-modal information is obtained by using a guided-attention (GA) mechanism. First, the dot product $V_Q E_K^T$ of each visual regional feature $V_Q$ and the word key feature $E_K$ pair is calculated, to obtain original attention weights used to aggregate the text word feature to each visual feature composition. Then, normalization is performed on these attention weights, to obtain final attention weights. By using the final attention weights, information from the text word feature to a particular visual feature composition may be expressed as a weighted sum of the word value feature $E_V$.

$$GA(V_Q, E_K, E_V) = \text{softmax}\left(\frac{V_Q E_K^T}{\sqrt{\text{dim}}}\right) E_V$$

S33. Obtain a fusion visual feature by using a residual structure, according to products obtained by respectively multiplying the characteristics of the visual regional compositions with the self-attention weights and the cross-modal attention weights of the visual regional feature.

Exemplarily, according to the products that respectively multiplying the characteristics $R_i^{VA}$ and $R_i^{VB}$ of each visual regional composition $V_i$ with the corresponding self-attention weight $SA(V_i)$ and the cross-modal attention weight $GA(V_i)$ of each visual regional composition $V_i$, the fusion visual feature is obtained by using the residual structure:

$$\tilde{V}_i = V_i + R_i^{VA} \times VSA(V_i) + R_i^{VB} \times VGA(V_i)$$

In the embodiments, the self-attention mechanism and the guided-attention mechanism are in a mixed use, so as to allow full utilization of the complementary characteristic of the multimodal data, with no influence by irrelevant information. The residual structure can prevent a degradation problem when updating the model, and at the same time solve a gradient problem, thereby realizing the fine-grained mixing fusion of multimodal information.

Figure 6:
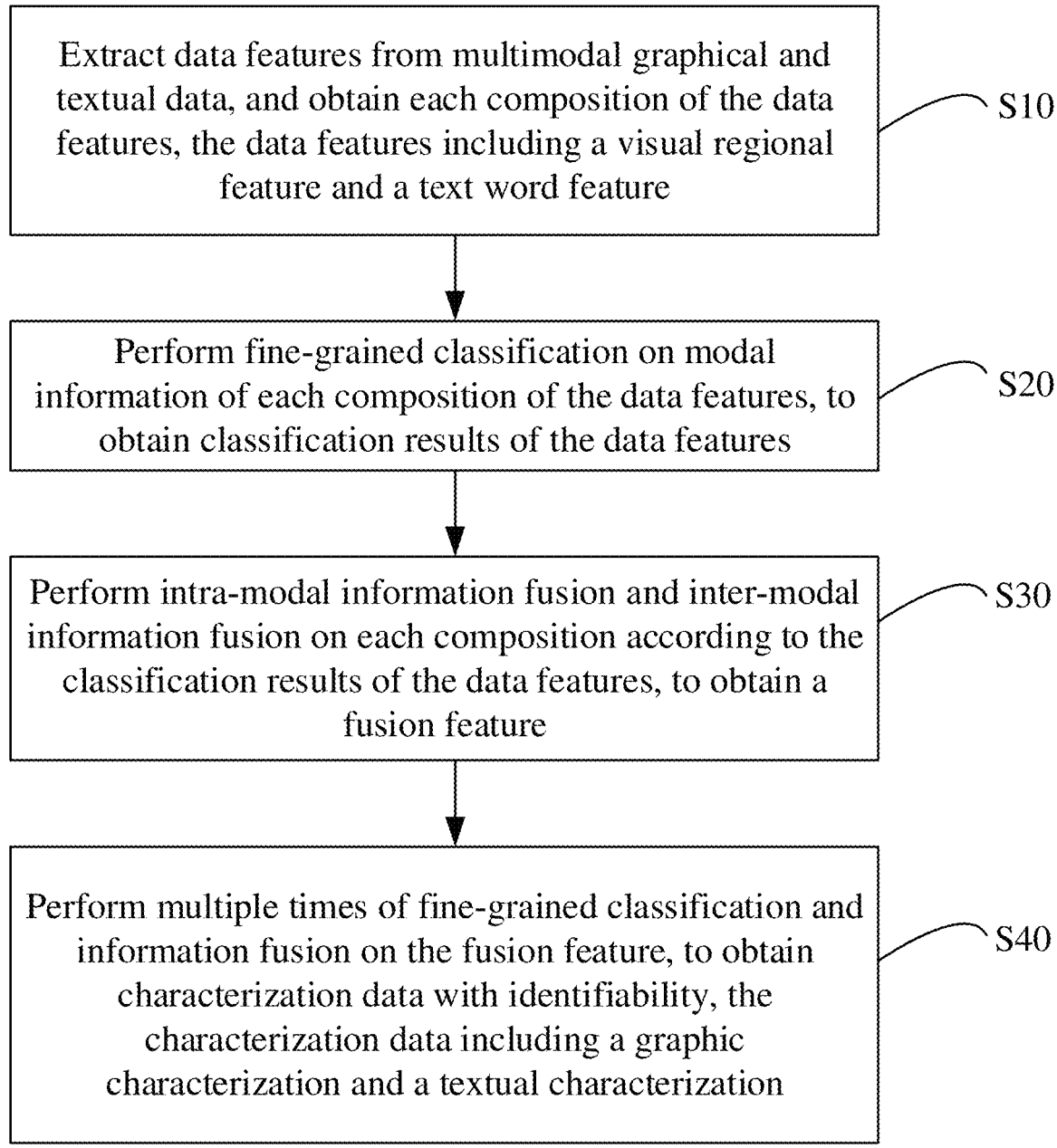
FIG. 6 is a flowchart of another multimodal fine-grained mixing method according to an embodiment of the present disclosure.

In some embodiments, as shown in FIG. 6, the multimodal fine-grained mixing method further includes:

S40. Perform multiple times of fine-grained classification and information fusion on the fusion feature, to obtain characterization data with identifiability. The characterization data includes a graphic characterization and a textual characterization.

In the embodiments, the fusion feature is subjected to multiple times of fine-grained classification and information fusion, to obtain the characterization data with identifiability. The characterization data includes the graphic characterization and the textual characterization. Average pooling is performed on the graphic characterization and the textual characterization respectively, to obtain a final graphic characterization and textual characterization. These characterization features may be processed into the final fused feature by means of splicing, multiplication, addition, etc. Subsequently, different loss functions may be used according to different downstream tasks.

Compared to the existing fusion method, the multimodal fine-grained mixing method provided by the embodiments of the present disclosure does not take the modality as a unit, but rather, selects suitable interaction manners with consideration of the characteristics of different compositions in each modality and a difference in the context, so as to enable the multimodal model to utilize the complementary characteristic of the multimodal data, with no influence by irrelevant information.

Figure 7:
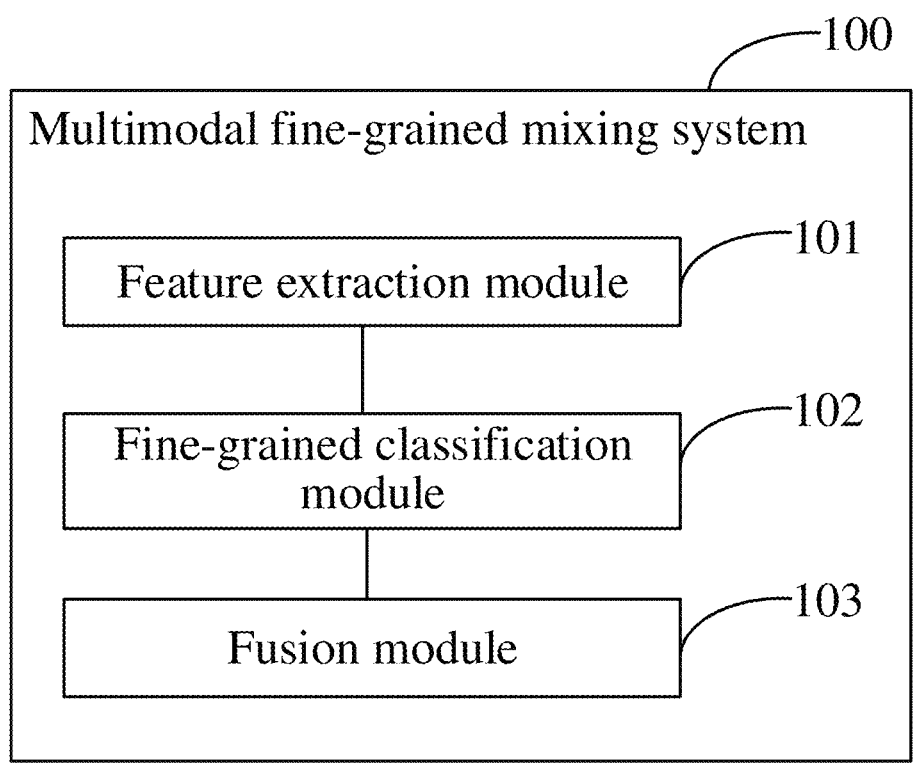
FIG. 7 is a structural diagram of a multimodal fine-grained mixing system according to an embodiment of the present disclosure.

As shown in FIG. 7, an embodiment of the present disclosure also provides a multimodal fine-grained mixing system 100 adopting the multimodal fine-grained mixing method in the foregoing embodiments, including: a feature extraction module 101, a fine-grained classification module 102, and a fusion module 103.

The feature extraction module 101 is configured to extract data features from multimodal graphic and textual data, and obtain each composition of the data features. The data features include a visual regional feature and a text word feature.

The fine-grained classification module 102 is configured to perform fine-grained classification on modal information of each composition of the data features, to obtain classification results of the data features.

The module 103 is configured to perform intra-modal and inter-modal information fusion on each composition according to the classification results of the data features, to obtain a fusion feature.

The specific description of the multimodal fine-grained mixing system may refer to the foregoing description of the multimodal fine-grained mixing method. The multimodal fine-grained mixing system and the multimodal fine-grained mixing method provided in the foregoing embodiments are based on same inventive concept. Therefore, the steps in each specific embodiment of the multimodal fine-grained mixing method may be executed by a corresponding functional module, and specific functions in the functional modules may also have corresponding method steps in the multimodal fine-grained mixing system, which is not detailed herein. Each module in the foregoing multimodal fine-grained mixing system may be implemented in whole or in part by software, hardware, and a combination of the two. The foregoing modules may be embedded in or independent of the processor in a computer device in the form of hardware, or may be stored in the memory of the computer device in the form of software, so as to allow the processor to call and execute operations corresponding to the foregoing modules.

An embodiment of the present disclosure also provides a device, including a memory and one or more processors. The memory is configured to store one or more programs. The one or more programs, when executed by the one or more processors, cause the one or more processors to perform the multimodal fine-grained mixing method described in any of the foregoing embodiments.

The memory may be configured to store computer programs and/or modules. The processor implements various functions of the computer device by running or executing the computer programs and/or modules stored in the memory and calling data stored in the memory. The memory mainly includes a program storage area and a data storage area. The program storage area may store an operating system, an application program required by at least one function. The data storage area may store data created according to a requirement of a terminal. In addition, the memory may include a high-speed random-access memory, and may also include a non-volatile memory, such as a hard disk, an internal memory, a plug-in hard disk, a smart media card (SMC), a secure digital (SD) card, a flash card, and at least one magnetic disk storage device, flash memory device, or other volatile solid-state storage device.

The processor may be a central processing unit (CPU), and may also be any other general-purpose processor, digital signal processor (DSP), application specific integrated circuits (ASIC), field-programmable gate array (FPGA), or any other programmable logic device, discrete gate or transistor logic device, discrete hardware component, etc. The general-purpose processor may be a microprocessor or any conventional processor. The processor is a control center of the computer device, and is connected with each part of the entire computer device through various interfaces and lines.

An embodiment of the present disclosure also provides a computer-readable storage medium (e.g., a non-transitory computer-readable storage medium), which stores a computer program instruction. The computer program instruction, when executed by a processor, causes the processor to perform one or more steps in the multimodal fine-grained mixing method described in any of the foregoing embodiments.

Exemplarily, the foregoing computer-readable storage medium may include, but is not limited to, any of a magnetic storage device (e.g., a hard disk, a floppy disk, or a tape, etc.), an optical disk (e.g., a compact disk, a digital versatile disk), a smart card, and a flash memory device (e.g., an erasable programmable read-only memory, a card, a stick or a key driver). The various computer-readable storage mediums described herein may represent one or more devices and/or any other machine-readable storage medium for storing information. The term "machine-readable storage medium" may include, but is not limited to, a wireless channel and any other medium capable of storing, including, and/or carrying instructions and/or data.

From above, compared to the related art, the multimodal fine-grained mixing method and system, the device, and the storage medium according to the present disclosure do not take the modality as a unit, but rather, select suitable interaction manners with consideration of the characteristics of different compositions in each modality and a difference in the context, so as to enable the multimodal model to utilize the complementary characteristic of the multimodal data, with no influence by irrelevant information.

The foregoing are only illustrative embodiments in accordance with the present disclosure. Any improvements and replacements that are made taking advantage of the specification and accompanying drawings of the present disclosure and any direct or indirect applications thereof in other related technical fields are within the protection scope of the present disclosure.

What is claimed is:

1. A multimodal fine-grained mixing method, comprising:
extracting data features from multimodal graphic and textual data, and obtaining each composition of the data features, the data features comprising a visual regional feature and a text word feature;
performing fine-grained classification on modal information of each composition of the data features, to obtain classification results of the data features; and
performing intra-modal and inter-modal information fusion on each composition according to the classification results of the data features, to obtain a fusion feature;

wherein the step of performing fine-grained classification on modal information of each composition of the data features, to obtain classification results of the data features comprises:
calculating an intra-modal correlation and an inter-modal correlation of each visual feature composition $V_i$, to obtain characteristics of each visual feature composition $V_i$, so as to obtain a classification result of the visual regional feature; and
calculating an intra-modal correlation and an inter-modal correlation of each text feature composition $E_i$, to obtain characteristics of each text feature composition $E_i$, so as to obtain a classification result of the text word feature;

wherein the step of calculating an intra-modal correlation and an inter-modal correlation of each visual feature composition $V_i$, to obtain characteristics of each visual feature composition $V_i$, so as to obtain a classification result of the visual regional feature comprises: performing normalization on the intra-modal correlation $R_i^{VB}$ and the inter-modal correlation $R_i^{VA}$ of each visual feature composition $V_i$, to obtain the characteristics of each visual feature composition $V_i$:

$$R_i^{VA} = \text{softmax}(R_i^{VA}, R_i^{VB});$$

$$R_i^{VB} = \text{softmax}(R_i^{VB}, R_i^{VA});$$

wherein the step of calculating an intra-modal correlation and an inter-modal correlation of each text feature composition $E_i$, to obtain characteristics of each text feature composition $E_i$, so as to obtain a classification result of the text word feature comprises: performing normalization on the intra-modal correlation $R_i^{EB}$ and the inter-modal correlation $R_i^{EA}$ of each text feature composition $E_i$, to obtain the characteristics of each text feature composition $E_i$:

$$R_i^{EA} = \text{softmax}(R_i^{EA}, R_i^{EB});$$

$$R_i^{EB} = \text{softmax}(R_i^{EB}, R_i^{EA}); \text{ and}$$

wherein the step of performing intra-modal and inter-modal information fusion on each composition according to the classification results of the data features, to obtain a fusion feature comprises:
converting each visual feature composition and each text feature composition into corresponding query features and key-value pair features;
calculating a dot product of a visual regional query feature and a visual key feature corresponding to each visual feature composition, to obtain a self-attention weight of each visual feature composition, and performing normalization on the self-attention weight of each visual feature composition, to obtain self-modal information;
calculating a dot product of the visual regional query feature corresponding to each visual feature composition and a word key feature, to obtain a cross-modal attention weight of each visual feature composition, and performing normalization on the cross-modal attention weight of each visual feature composition, to obtain cross-modal information of each visual feature composition; and
obtaining, according to products obtained by respectively multiplying the characteristics of each visual regional composition with the self-modal information and the cross-modal information of each visual regional composition, a fusion visual feature composition by using a residual structure, and constructing a fusion visual feature with each fusion visual feature composition.

2. The multimodal fine-grained mixing method according to claim 1, wherein the step of calculating an intra-modal correlation and an inter-modal correlation of each visual feature composition $V_i$, to obtain characteristics of each visual feature composition $V_i$, so as to obtain a classification result of the visual regional feature comprises:

calculating the intra-modal correlation $R_i^{VB}$ of each visual feature composition $V_i$:

$$M_{ij}^V = \frac{V_i^T V_j}{\|V_i\|\|V_j\|}, i \in [1, L_V], j \in [1, L_V];$$

$$B_i^V = \sum_{j=1}^{L_V} \beta_{ij}^V V_i;$$

$$\beta_{ij}^V = \frac{\exp(M_{ij}^V)}{\sum_{j=1}^{L_V} \exp(M_{ij}^V)};$$

$$R_i^{VB} = \frac{V_i^T B_i^V}{\|V_i\|\|B_i^V\|}; \text{ and}$$

calculating the inter-modal correlation $R_i^{VA}$ of each visual feature composition $V_i$:

$$S_{ij}^V = \frac{V_i^T E_j}{\|V_i\|\|E_j\|}, i \in [1, L_V], j \in [1, L_E];$$

$$A_i^V = \sum_{j=1}^{L_E} \alpha_{ij}^V E_j;$$

$$\alpha_{ij}^V = \frac{\exp(S_{ij}^V)}{\sum_{j=1}^{L_E} \exp(S_{ij}^V)};$$

$$R_i^{VA} = \frac{V_i^T A_i^V}{\|V_i\|\|A_i^V\|}; \text{ and}$$

the step of calculating an intra-modal correlation and an inter-modal correlation of each text feature composition $E_i$, to obtain characteristics of each text feature composition $E_i$, so as to obtain a classification result of the text word feature comprises:

calculating the intra-modal correlation $R_i^{EB}$ of each text feature composition $E_i$:

$$M_{ij}^E = \frac{E_i^T E_j}{\|E_i\|\|E_j\|}, i \in [1, L_E], j \in [1, L_E];$$

$$\beta_{ij}^E = \frac{\exp(M_{ij}^E)}{\sum_{j=1}^{L_E} \exp(M_{ij}^E)};$$

$$B_i^E = \sum_{j=1}^{L_E} \beta_{ij}^E E_j;$$

$$R_i^{EB} = \frac{E_i^T B_i^E}{\|E_i\|\|B_i^E\|}; \text{ and}$$

calculating the inter-modal correlation $R_i^{EA}$ of each text feature composition $E_i$:

$$S_{ij}^E = \frac{E_i^T V_j}{\|E_i\|\|V_j\|}, i \in [1, L_E], j \in [1, L_V];$$

$$\alpha_{ij}^E = \frac{\exp(S_{ij}^E)}{\sum_{j=1}^{L_V} \exp(S_{ij}^E)};$$

$$A_i^E = \sum_{j=1}^{L_V} \alpha_{ij}^E V_j;$$

$$R_i^{EA} = \frac{E_i^T A_i^E}{\|E_i\|\|A_i^E\|}.$$

3. A multimodal fine-grained mixing system using the multimodal fine-grained mixing method according to claim 2, comprising: a feature extraction module, a fine-grained classification module, and a fusion module;

the feature extraction module, configured to extract data features from multimodal graphic and textual data, and obtain each composition of the data features, the data features comprising a visual regional feature and a text word feature;

the fine-grained classification module, configured to perform fine-grained classification on modal information of each composition of the data features, to obtain classification results of the data features;

wherein the fine-grained classification module is further configured to:

calculate an intra-modal correlation and an inter-modal correlation of each visual feature composition $V_i$, to obtain characteristics of each visual feature composition $V_i$, so as to obtain a classification result of the visual regional feature; and calculate an intra-modal correlation and an inter-modal correlation of each text feature composition $E_i$, to obtain characteristics of each text feature composition $E_i$, so as to obtain a classification result of the text word feature; and perform normalization on the intra-modal correlation $R_i^{VB}$ and the inter-modal correlation $R_i^{VA}$ of each visual feature composition $V_i$, to obtain the characteristics of each visual feature composition $V_i$:

$R_i^{VA}=\text{softmax}(R_i^{VA}, R_i^{VB})$;

$R_i^{VB}=\text{softmax}(R_i^{VB}, R_i^{VA})$; and perform normalization on the intra-modal correlation $R_i^{EB}$ and the inter-modal correlation $R_i^{EA}$ of each text feature composition $E_i$, to obtain the characteristics of each text feature composition $E_i$:

$R_i^{EA}=\text{softmax}(R_i^{EA}, R_i^{EB})$;

$R_i^{EB}=\text{softmax}(R_i^{EB}, R_i^{EA})$; and the fusion module, configured to perform intra-modal and inter-modal information fusion on each composition according to the classification results of the data features, to obtain a fusion feature;

wherein the fusion module is further configured to:

convert each visual feature composition and each text feature composition into corresponding query features and key-value pair features;

calculate a dot product of a visual regional query feature and a visual key feature corresponding to each visual feature composition, to obtain a self-attention weight of each visual feature composition, and performing normalization on the self-attention weight of each visual feature composition, to obtain self-modal information; and calculate a dot product of the visual regional query feature corresponding to each visual feature composition and a word key feature, to obtain a cross-modal attention weight of each visual feature composition, and perform normalization on the cross-modal attention weight of each visual feature composition, to obtain cross-modal information of each visual feature composition; and obtain, according to products obtained by respectively multiplying the characteristics of each visual regional composition with the self-modal information and the cross-modal information of each visual regional composition, a fusion visual feature composition by using a residual structure, and construct a fusion visual feature with each fusion visual feature composition.

4. A device, comprising: a memory and one or more processors;

the memory being configured to store one or more programs; and the one or more programs, when executed by the one or more processors, causing the one or more processors to perform the multimodal fine-grained mixing method according to claim 2.

5. A non-transitory computer-readable storage medium, storing a computer program instruction, the computer program instruction, when executed by a processor, causing the processor to perform one or more steps in the multimodal fine-grained mixing method according to claim 2.

6. The multimodal fine-grained mixing method according to claim 1, wherein after the step of performing intra-modal and inter-modal information fusion on each composition according to the classification results of the data features, to obtain a fusion feature, the multimodal fine-grained mixing method further comprises:

performing multiple times of fine-grained classification and information fusion on the fusion feature, to obtain characterization data with identifiability, the characterization data comprising a graphic characterization and a textual characterization.

7. A multimodal fine-grained mixing system using the multimodal fine-grained mixing method according to claim 6, comprising: a feature extraction module, a fine-grained classification module, and a fusion module;

the feature extraction module, configured to extract data features from multimodal graphic and textual data, and obtain each composition of the data features, the data features comprising a visual regional feature and a text word feature;

the fine-grained classification module, configured to perform fine-grained classification on modal information of each composition of the data features, to obtain classification results of the data features;

wherein the fine-grained classification module is further configured to:

calculate an intra-modal correlation and an inter-modal correlation of each visual feature composition $V_i$, to obtain characteristics of each visual feature composition $V_i$, so as to obtain a classification result of the visual regional feature; and calculate an intra-modal correlation and an inter-modal correlation of each text feature composition $E_i$, to obtain characteristics of each text feature composition $E_i$, so as to obtain a classification result of the text word feature; and perform normalization on the intra-modal correlation $R_i^{VB}$ and the inter-modal correlation $R_i^{VA}$ of each visual feature composition $V_i$, to obtain the characteristics of each visual feature composition $V_i$:

$$R_i^{VA}=\text{softmax}(R_i^{VA},R_i^{VB});$$

$$R_i^{VB}=\text{softmax}(R_i^{VB},R_i^{VA});\text{ and}$$

perform normalization on the intra-modal correlation $R_i^{EB}$ and the inter-modal correlation $R_i^{EA}$ of each text feature composition $E_i$, to obtain the characteristics of each text feature composition $E_i$:

$$R_i^{EA}=\text{softmax}(R_i^{EA},R_i^{EB});$$

$$R_i^{EB}=\text{softmax}(R_i^{EB},R_i^{EA});\text{ and}$$

the fusion module, configured to perform intra-modal and inter-modal information fusion on each composition according to the classification results of the data features, to obtain a fusion feature;

wherein the fusion module is further configured to:

convert each visual feature composition and each text feature composition into corresponding query features and key-value pair features;

calculate a dot product of a visual regional query feature and a visual key feature corresponding to each visual feature composition, to obtain a self-attention weight of each visual feature composition, and performing normalization on the self-attention weight of each visual feature composition, to obtain self-modal information; and calculate a dot product of the visual regional query feature corresponding to each visual feature composition and a word key feature, to obtain a cross-modal attention weight of each visual feature composition, and perform normalization on the cross-modal attention weight of each visual feature composition, to obtain cross-modal information of each visual feature composition; and obtain, according to products obtained by respectively multiplying the characteristics of each visual regional composition with the self-modal information and the cross-modal information of each visual regional composition, a fusion visual feature composition by using a residual structure, and construct a fusion visual feature with each fusion visual feature composition.

8. A device, comprising: a memory and one or more processors;

the memory being configured to store one or more programs; and the one or more programs, when executed by the one or more processors, causing the one or more processors to perform the multimodal fine-grained mixing method according to claim 6.

9. A non-transitory computer-readable storage medium, storing a computer program instruction, the computer program instruction, when executed by a processor, causing the processor to perform one or more steps in the multimodal fine-grained mixing method according to claim 6.

10. A multimodal fine-grained mixing system using the multimodal fine-grained mixing method according to claim 1, comprising: a feature extraction module, a fine-grained classification module, and a fusion module;

the feature extraction module, configured to extract data features from multimodal graphic and textual data, and obtain each composition of the data features, the data features comprising a visual regional feature and a text word feature;

the fine-grained classification module, configured to perform fine-grained classification on modal information of each composition of the data features, to obtain classification results of the data features;

wherein the fine-grained classification module is further configured to:

calculate an intra-modal correlation and an inter-modal correlation of each visual feature composition $V_i$, to obtain characteristics of each visual feature composition $V_i$, so as to obtain a classification result of the visual regional feature; and calculate an intra-modal correlation and an inter-modal correlation of each text feature composition $E_i$, to obtain characteristics of each text feature composition $E_i$, so as to obtain a classification result of the text word feature; and perform normalization on the intra-modal correlation $R_i^{VB}$ and the inter-modal correlation $R_i^{VA}$ of each visual feature composition $V_i$, to obtain the characteristics of each visual feature composition $V_i$:

$R_i^{VA} = \text{softmax}(R_i^{VA}, R_i^{VB});$ $R_i^{VB} = \text{softmax}(R_i^{VB}, R_i^{VA});$ and perform normalization on the intra-modal correlation $R_i^{EB}$ and the inter-modal correlation $R_i^{EA}$ of each text feature composition $E_i$, to obtain the characteristics of each text feature composition $E_i$:

$R_i^{EA} = \text{softmax}(R_i^{EA}, R_i^{EB});$ $R_i^{EB} = \text{softmax}(R_i^{EB}, R_i^{EA});$ and the fusion module, configured to perform intra-modal and inter-modal information fusion on each composition according to the classification results of the data features, to obtain a fusion feature;

wherein the fusion module is further configured to:

convert each visual feature composition and each text feature composition into corresponding query features and key-value pair features;

calculate a dot product of a visual regional query feature and a visual key feature corresponding to each visual feature composition, to obtain a self-attention weight of each visual feature composition, and performing normalization on the self-attention weight of each visual feature composition, to obtain self-modal information; and calculate a dot product of the visual regional query feature corresponding to each visual feature composition and a word key feature, to obtain a cross-modal attention weight of each visual feature composition, and perform normalization on the cross-modal attention weight of each visual feature composition, to obtain cross-modal information of each visual feature composition; and obtain, according to products obtained by respectively multiplying the characteristics of each visual regional composition with the self-modal information and the cross-modal information of each visual regional composition, a fusion visual feature composition by using a residual structure, and construct a fusion visual feature with each fusion visual feature composition.

11. A device, comprising: a memory and one or more processors;

the memory being configured to store one or more programs; and the one or more programs, when executed by the one or more processors, causing the one or more processors to perform the multimodal fine-grained mixing method according to claim 1.

12. A non-transitory computer-readable storage medium, storing a computer program instruction, the computer program instruction, when executed by a processor, causing the processor to perform one or more steps in the multimodal fine-grained mixing method according to claim 1.

* * * * *